United States Patent [19]

Chang

[11] Patent Number: 6,022,078
[45] Date of Patent: Feb. 8, 2000

[54] HEADREST OF A SEAT WITH ADJUSTABLE POSITIONING RODS

[76] Inventor: Yung-Tsung Chang, No.1, Lane 160, Ta-Hu St., Nei-Hu Dist., Taipei, Taiwan

[21] Appl. No.: 09/229,835

[22] Filed: Jan. 13, 1999

[51] Int. Cl.[7] ..................................................... A47C 1/10
[52] U.S. Cl. ........................... 297/391; 297/407; 297/410
[58] Field of Search ..................................... 297/391, 393, 297/397, 407, 408, 410, 353, 411.23, 411.36

[56] References Cited

U.S. PATENT DOCUMENTS

| 4,351,563 | 9/1982 | Hattori | 297/391 X |
| 5,011,226 | 4/1991 | Ikeda et al. | 297/391 X |

FOREIGN PATENT DOCUMENTS

| 2504790 | 11/1982 | France | 297/391 |

*Primary Examiner*—Laurie K. Cranmer
*Attorney, Agent, or Firm*—Patterson & Keough, P.A.

[57] ABSTRACT

A headrest includes an L-shaped board and a casing, both of which pivotally clamp a shaft extending transversely between the board and the casing. Two tubular members are movably mounted on the shaft and each has a tube, which extends through the bottom of the board. Each of the tubes has a positioning rod connected thereto, which extends into the seat and is engaged with the engaging device in the seat. Each of the positioning rods has a plurality of notches defined therein and is connected to one of the two respective tubes by bolts extending through the tubes and contacting against the positioning rods. The distance between the positioning rods can be adjusted by moving the tubular members, and the two positioning rods can be rotated by releasing the bolts so as to engage with different engaging devices.

6 Claims, 5 Drawing Sheets

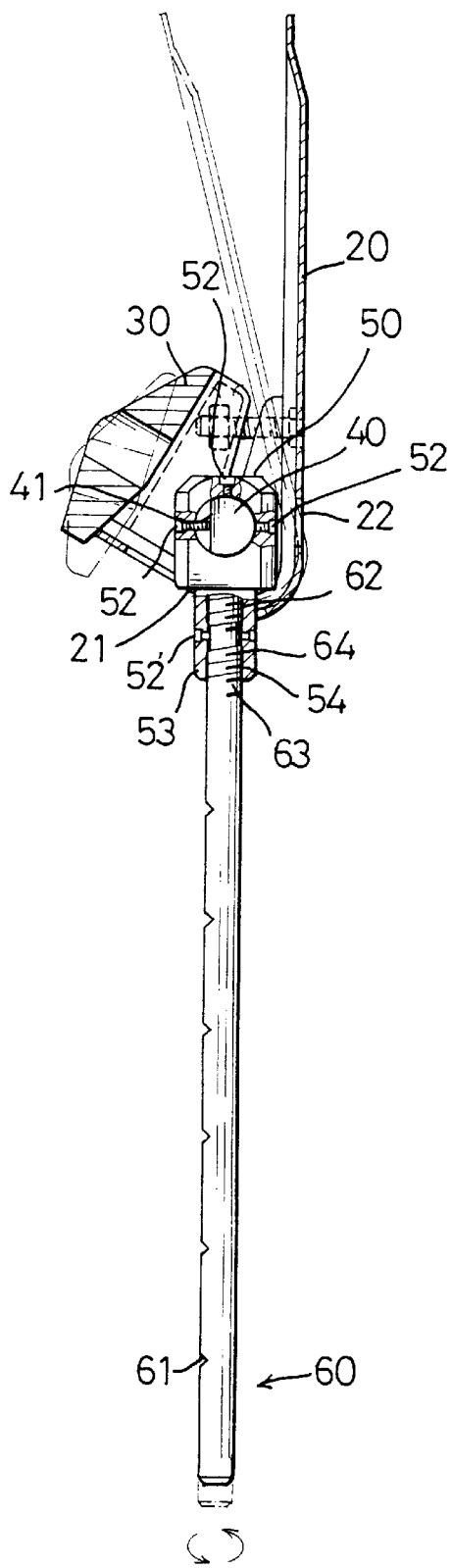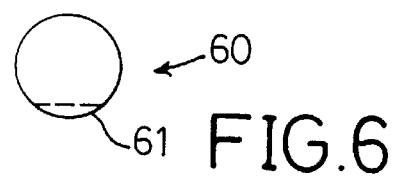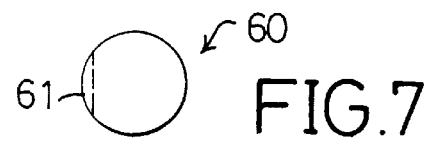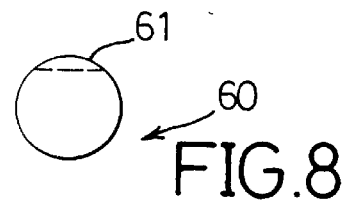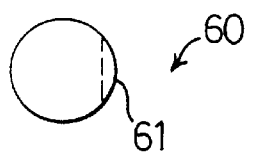

HEADREST OF A SEAT WITH ADJUSTABLE POSITIONING RODS

FIELD OF THE INVENTION

The present invention relates to a device for adjusting the distance between two positioning rods of a headrest of a seat in vehicles so as to adapt different systems of the engaging device in vehicle seats.

BACKGROUND OF THE INVENTION

A conventional vehicle seat includes a backrest, a seat and a headrest, which is connected to the top of the backrest. The headrest has two positioning rods extending into the backrest in which an engaging device is received which engages with notches defined in each of the two positioning rods so that users may pull the headrest to a desired height by operating the engaging device. The distance between the two positioning rods is fixed so that the headrest cannot be used with a seat which is not designed for the specific headrest, for example a seat of a different model vehicle.

The present invention intends to provide a headrest wherein the distance between the two positioning rods of the headrest can be adjusted to accommodate different engaging devices.

SUMMARY OF THE INVENTION

In accordance with one aspect of the present invention, there is provided a headrest structure of a seat comprising an L-shaped board having two first slots defined in the bottom thereof and a casing connected to the lower end of the board with a shaft extending transversely therebetween. Two tubular members are movably mounted to the shaft and each has a tube which extends through the slot of the board. Two positioning rods are respectively and rotatably connected to the two tubes of the two tubular members and each of the positioning rods has a plurality of notches defined therein.

It is an object of the present invention to provide a headrest for a seat wherein the distance between the two positioning rods can be easily adjusted.

Another object of the present invention is to provide a headrest for a seat wherein each of the positioning rods has a plurality of notches and is rotatable relative to the headrest.

Further objects, advantages, and features of the present invention will become apparent from the following detailed description with appropriate reference to the accompanying drawings.

BRIEF DESCRIPTION OF THE DRAWINGS

FIG. 5 is a side elevational view, partly in section, of the structure of the headrest in accordance with the present invention, wherein the L-shaped board is pivoted relative to the shaft and the positioning rods are rotatable;

FIG. 6 is a top illustrative view to show the positioning rod rotated to let the notches face tote front side;

FIG. 7 is a top illustrative view to show the positioning rod rotated to let the notches face to the left side;

FIG. 8 is a top illustrative view to show the positioning rod rotated to let the notches face to the rear side, and FIG. 9 is a top illustrative view to show the positioning rod rotated to let the notches face to the right side.

DETAILED DESCRIPTION OF THE PREFERRED EMBODIMENTS

Figure 1:
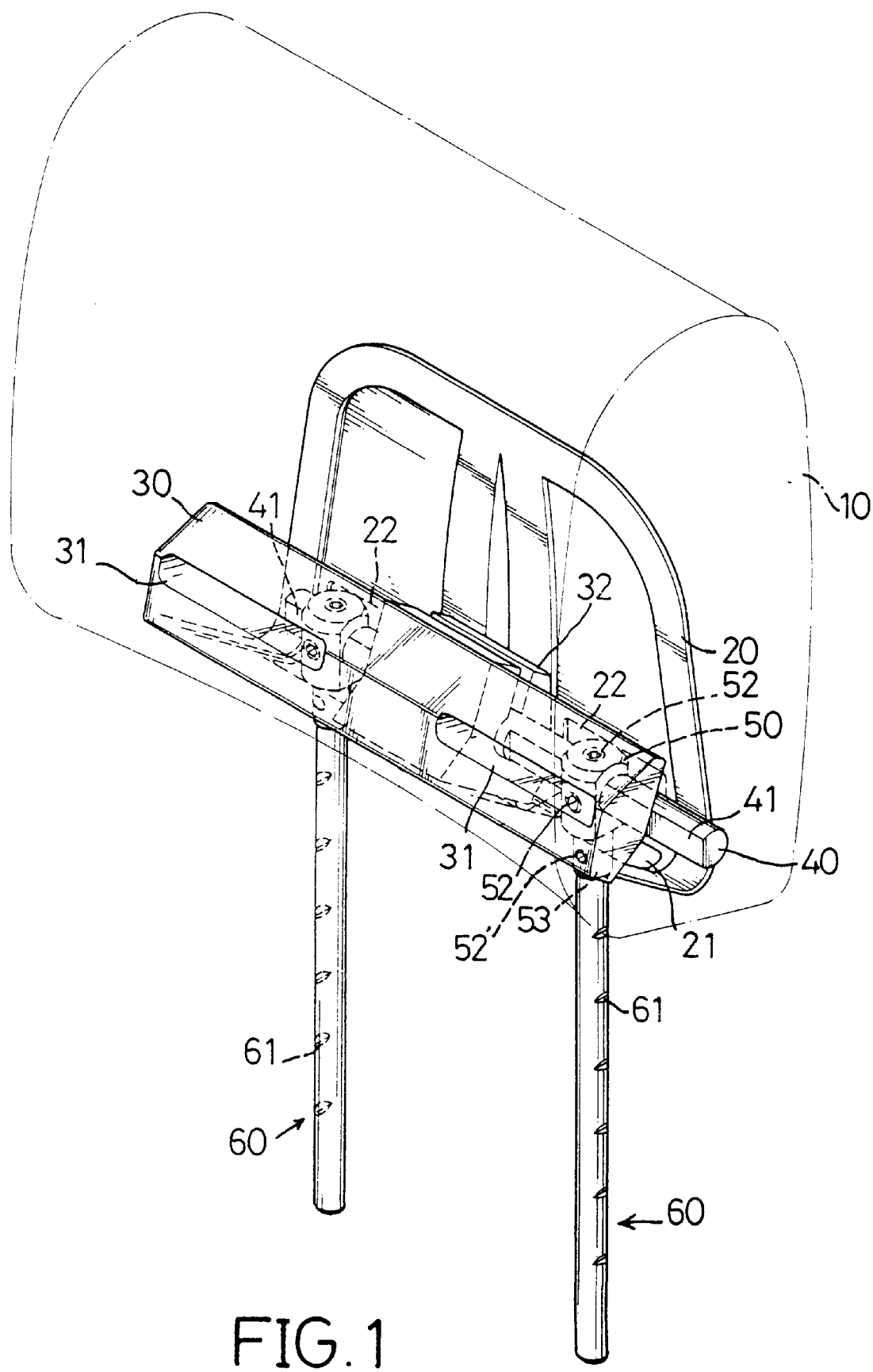
FIG. 1 a perspective view of the headrest in accordance with the present invention.
Figure 2:
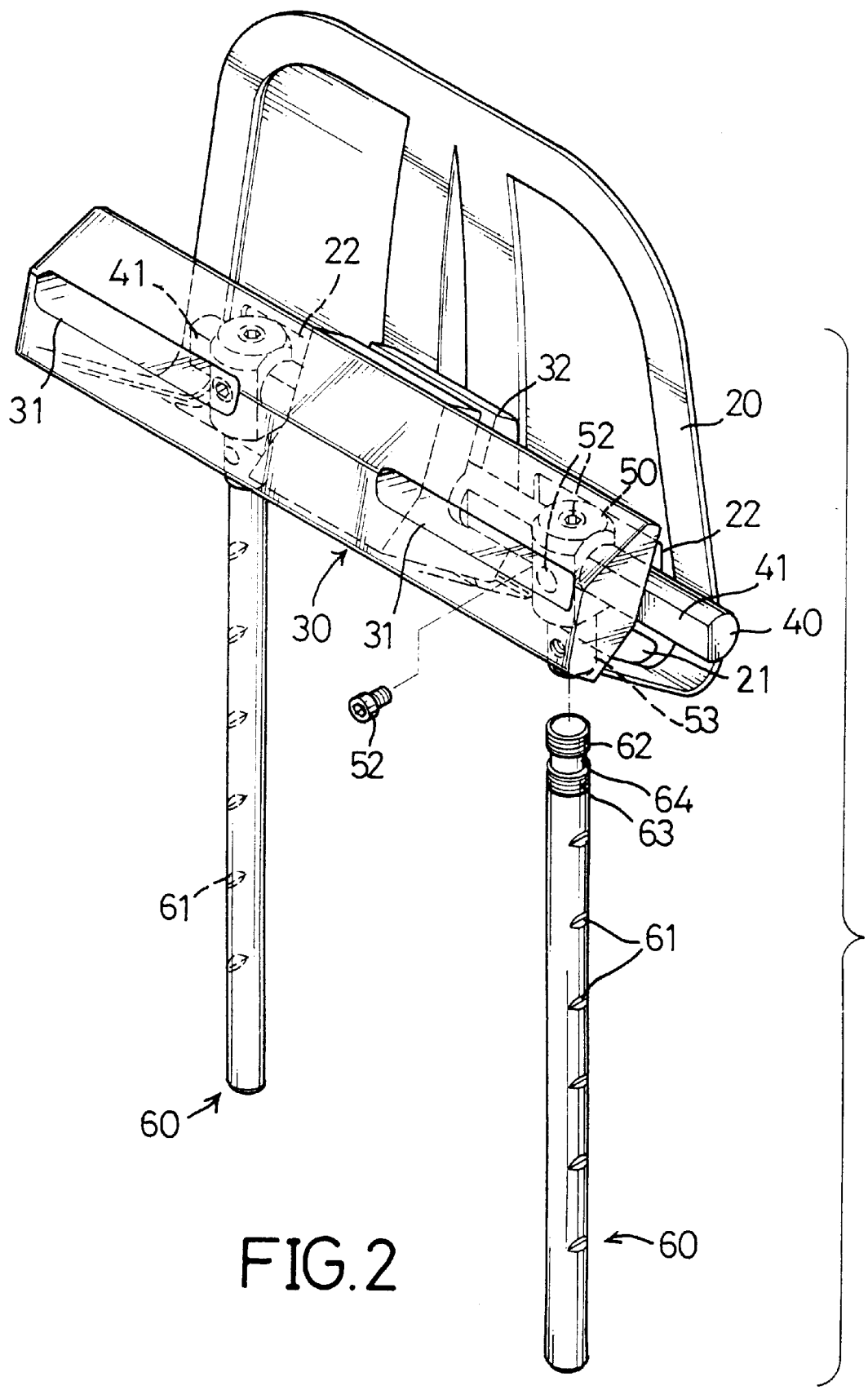
FIG. 2 an exploded view of the structure of the headrest and one of the two positioning rods in accordance with the present invention.
Figure 3:
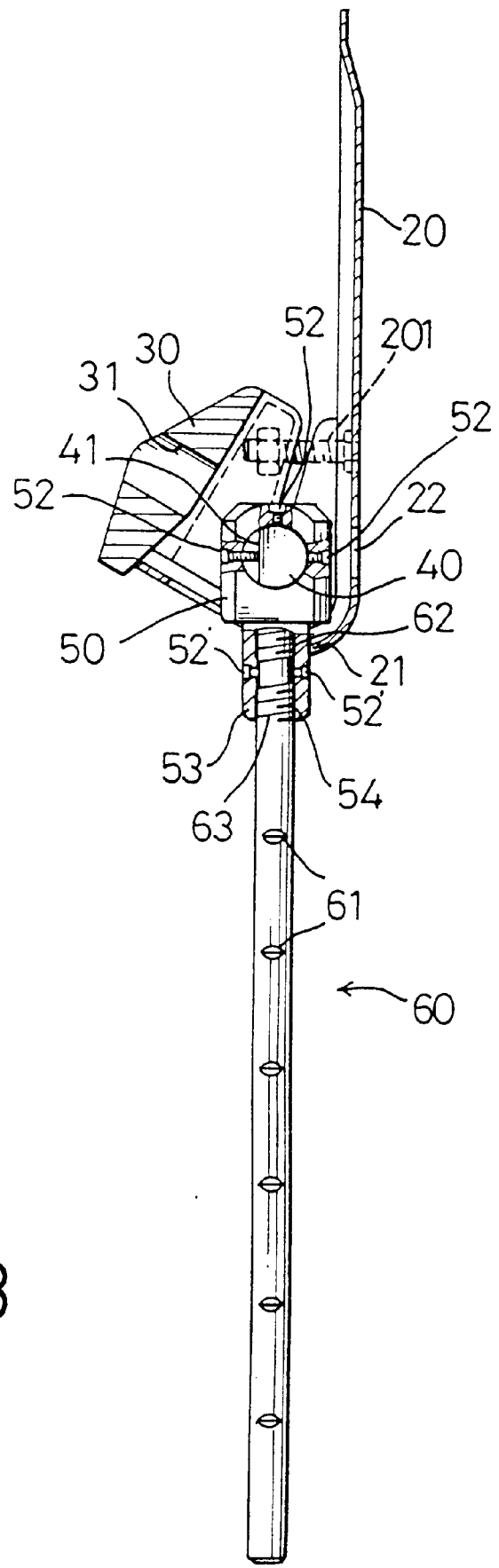
FIG. 3 is a side elevational view, partly in section, of the structure of the headrest in accordance with the present invention.

Referring to FIGS. 1 to 3, the headrest of a vehicle seat comprises an L-shaped board 20 having two first slots 21 defined in the horizontal portion thereof and two second slots 22 defined in the upright portion thereof. A casing 30 is connected to the edge of the horizontal portion of the board 20. A clamp member 32 is received in the casing 30 and connected to the upright portion of the board 20 by extending two bolts 201 through the upright portion of the board 20 and threadedly engaged with two respective nuts in the clamp 32. The casing 30 has two third slots 31 defined therethrough. A shaft 40 is clamped by the clamp member 32 and has two plain surfaces 41 defined in the periphery of the two ends thereof.

Two tubular members 50 each are movably mounted to the shaft 40. Three bolts 52 respectively extend through the tubular members 50 from the top and two opposite sides thereof via the second slots 22 and the third slots 31 to contact the plain surface 41 and the periphery of the shaft 40 so as to position the tubular member 50 relative to the shaft 40. Each of the tubular members 50 has a tube 53, which movably extends through the first slot 21 corresponding thereto and has a threaded inner periphery 54.

Two positioning rods 60 each have two threaded sections 62, 63 defined in the outside thereof with a neck 64 defined between the two threaded sections 62, 63. The positioning rods 60 are respectively and threadedly engaged with the threaded inner periphery 54 of each of the tubes 53. Two bolts 52' extend through the tubes 53 and contact against the neck portion 64 to hold the two positioning rods 60 in place. Each of the positioning rods 60 has a plurality of notches 61 defined therein so as to engage with the engaging device (not shown) in the seat.

Figure 4:
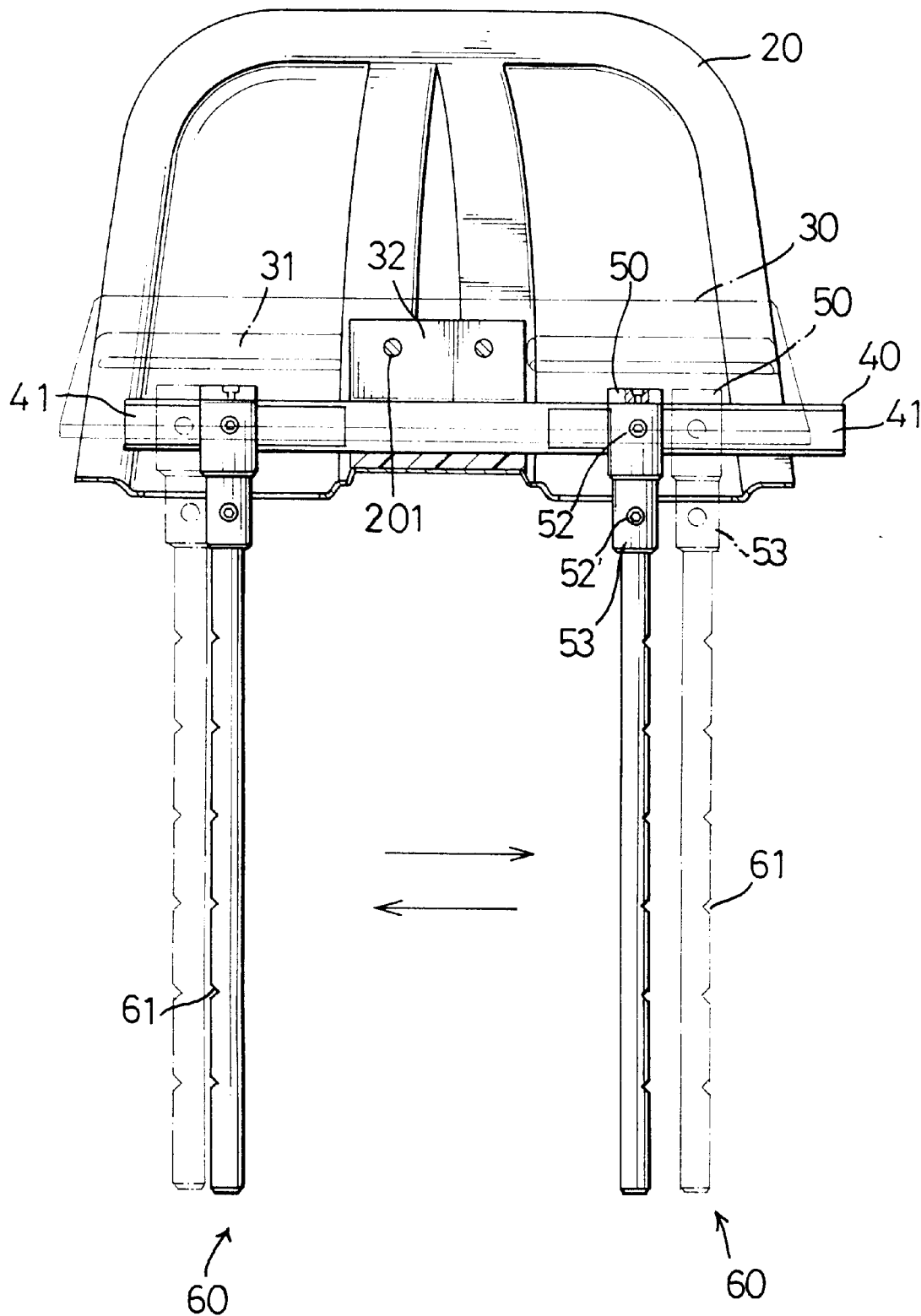
FIG. 4 is a front view of the structure of the headrest in accordance with the present invention, wherein the two tubular members together with the two positioning rods are slidable relative to the shaft.

A foam made member 10 is mounted to the assembly of the present invention and the two positioning rods 60 extend below the bottom of the member 10. FIG. 4 shows that the two tubular members 50 can be movable on the shaft 40 within the range of the first slots 21 so as to adapt the distance between the two positioning rods to different systems. FIG. 5 shows that the L-shaped board 20 and the casing 30 are pivotable about the shaft 40 to adjust the angle relative to a vertical plane. The orientation of the notches 61 on the positioning rods 60 can be changed by rotating the positioning rods 60 as shown in FIGS. 6 to 9.

Although the invention has been explained in relation to its preferred embodiment, it is to be understood that many other possible modifications and variations can be made without departing from the spirit and scope of the invention as hereinafter claimed.

What is claimed is:

1. A headrest of a seat, comprising:
    an L-shaped board having two first slots defined in a horizontal portion thereof;
    a casing connected to the horizontal portion of said board;
    two tubular members each having a tube movably extending through said first slot corresponding thereto;
    a shaft located between said casing and said L-shaped board, said two tubular members movably mounted to said shaft, and
    two positioning rods respectively and rotatably connected to said two tubes of said two tubular members, each of said positioning rods having a plurality of notches defined therein.

2. The headrest as claimed in claim 1, wherein said L-shaped board has two Second slots defined in an upright portion thereof so as to access said two tubular members thereby.

3. The headrest as claimed in claim 1, wherein said casing has two third slots defined therethrough so as to access said two tubular members thereby.

4. The headrest as claimed in claim 1, wherein each of said tubes has a threaded inner periphery and each of said positioning rods has two threaded sections defined on the outside thereof so as to engage with said threaded inner periphery of said tube corresponding thereto, a neck portion defined between said two threaded sections, each of said tubes having two bolts extending therethrough and contacting against said neck portion.

5. The headrest as claimed in claim 1, wherein said shaft has two plain surfaces respectively defined in the periphery of the two ends thereof.

6. The headrest as claimed in claim 1 further comprising a clamp member connected to an upright portion of said board and clamping said shaft therein.

\* \* \* \* \*